(12) United States Patent
Liersch et al.

(10) Patent No.: US 8,663,834 B2
(45) Date of Patent: Mar. 4, 2014

(54) RECHARGEABLE BATTERY PACK AND ELECTRICAL HAND TOOL DEVICE

(75) Inventors: Ralph Liersch, Metzingen (DE); Wolfgang Stickel, Beuren (DE); Jochen Graeber, Bissingen (DE)

(73) Assignee: Metabowerke GmbH, Nuertingen (DE)

( * ) Notice: Subject to any disclaimer, the term of this patent is extended or adjusted under 35 U.S.C. 154(b) by 1087 days.

(21) Appl. No.: 12/067,367

(22) PCT Filed: Sep. 20, 2005

(86) PCT No.: PCT/EP2005/010108
§ 371 (c)(1),
(2), (4) Date: Mar. 19, 2008

(87) PCT Pub. No.: WO2007/033689
PCT Pub. Date: Mar. 29, 2007

(65) Prior Publication Data
US 2008/0254356 A1    Oct. 16, 2008

(51) Int. Cl.
*H01M 2/24* (2006.01)
*H01M 2/10* (2006.01)

(52) U.S. Cl.
USPC .......................................... 429/160; 429/97

(58) Field of Classification Search
USPC .................................................. 429/160, 97
See application file for complete search history.

(56) References Cited

U.S. PATENT DOCUMENTS

2004/0115519 A1\* 6/2004 Lee ................................ 429/61
2005/0031945 A1\* 2/2005 Morita et al. ................. 429/158

\* cited by examiner

*Primary Examiner* — Karie O'Neill Apicella
(74) *Attorney, Agent, or Firm* — Paine Hamblen, LLP

(57) ABSTRACT

The invention relates to a rechargeable battery pack, in particular for an electrical hand tool device, comprising at least two series-connected rechargeable battery cells (20) and/or rechargeable batter cell blocks and an electronics unit having a printed circuit board (14), wherein sheet metal conductors (16) for electrically connecting the series-connected rechargeable battery cells (20) and/or rechargeable battery cell blocks are provided, wherein the sheet metal conductors (16) are connected directly to the printed circuit board (14).

1 Claim, 2 Drawing Sheets

RECHARGEABLE BATTERY PACK AND ELECTRICAL HAND TOOL DEVICE

The invention relates to a rechargeable battery pack, in particular one for a hand-held power tool, comprising at least two battery cells or battery cell blocks connected in series and an electronics unit with a printed circuit board, whereby sheet metal conductors are provided for electrically connecting the in series connected battery cells or battery cell blocks.

For example, it is often practiced to use battery packs for operating hand-held power tools because cordless tools offer greater flexibility during work and, in particular, independence from an existing power source, thus allowing work outside to be independent of the requirements of an electrical power outlet. Cordless tools include a rechargeable battery in a battery housing that can be coupled with the tool housing of the hand-held power tool, where upon coupling of the two housings the motor is electrically connected to the battery pack and is supplied with electricity from it. To couple the two housings, the battery housing is typically provided with a protruding locking device that is inserted into and engages in a complementing socket of the tool housing. The electrical contacts are typically established in the area of the locking device.

As a rule, it is provided to connect the individual battery cells, or the individual battery cell blocks, respectively, in series. At times, so-called sheet metal conductors are used providing the connection of respective complementary poles of a battery cell to each other.

A similar design for a battery is, for example, known from DE 94 04 070.2 that describes a battery set, where individual batteries are arranged in battery-holding cells, whereby sheet metal conductors are used to provide the series connection of the individual batteries to each other. Here, the sheet metal conductors are arranged in a curved manner according to the description.

In addition, it known for lithium ion batteries where the charge level and the charging procedure are monitored via the electronics of the battery pack to provide that the individual battery cells are connected with the electronics for the purpose of monitoring their cells. To this end, the state-of-the-art provides stranded wires that connect the battery cells with the electronics unit and here in particular with the pc-board. One disadvantage of this is the relatively high cost of assembly.

It is, therefore, the objective of the invention to provide a battery pack, where the series connections of the battery cells to each other as well as the connection to the pc-board are simplified.

According to the invention, this is done in that a battery pack of the generic kind provides such sheet metal conductors which are connected directly with the pc-board. In this manner, there is no need to additionally establish contacts between the individual battery cells and the electronics using stranded wires. It is particularly advantageous if the sheet metal conductors are used to establish both an electrical and a mechanical connection between the individual battery cells and the pc-board. In this manner, a support for the pc-board can be achieved by the sheet metal conductors in relation to a battery cell or a battery cell block at the same time. Here, a battery cell block refers to two or more battery cells that are switched in parallel and are connected in series to additional battery cells or battery cells blocks.

It can be provided that the sheet metal conductors are designed geometrically such that they protrude from the side of the pc-board in the form of terminal lugs. They can then be angled such that they point from the pc-board in the direction of the battery cells.

It is particularly advantageous if the sheet metal conductors are fastened to the pc-board by rivet joints. Rivet joints provide both a very simple mechanical and electrical contact and great reliability. Finally, using appropriate rivet joints can provide tolerance compensation as well as thermal expansion compensation.

In general, the mechanical as well as the electrical connection via sheet metal conductors to the pc-board offers the advantage that the pc-board is spring-supported in relation to the battery cells or the battery cell blocks, respectively, because the sheet metal conductors also act as spring elements. This achieves additional vibration strength because especially vibrations that occur with hand-held power tools, in particular with impact drills or hammer drills, can be compensated.

The combination of these various aspects in one component establishes the particular advantage of the invention.

In particular, the battery cells can be lithium ion cells. In particular with lithium ion cells it is possible to combine several battery cells to so-called battery cell blocks, where several battery cells are connected in parallel. In this case, one battery cell block each is connected with the electronics. Using the electronics, among other things, the charge level can be monitored via the voltage of the individual cells. In addition, the charging process can be controlled. The voltage for parallel connected cells is always the same; thus, for battery cell blocks, the voltage must be determined for each block.

By connecting the battery cells, or the battery cell blocks, respectively, to the pc-board, it can be determined, whether all battery cells are charged properly and/or whether a charging current is reached that the battery cells are not able to handle. Furthermore, a control can be provided that controls the charge current such that overloading of individual battery cells is prevented yet all battery cells can be charged fully. This results in a good usability of the respective battery pack and thus of the hand-held power tool using the battery pack over a long time. The poles of the individual battery cells can have a material connection, especially through welding or soldering, to the sheet metal conductors. In addition, it can be provided that the battery cells are supported by a battery cell carrier and are kept at a distance from each other in this carrier. This avoids shorts caused by contact between the individual battery cells. The cell carrier can be made of an injection-molded component that exhibits respective receptacles for the battery cells. Furthermore, fastening elements can be provided at the cell carrier that are used to connect the cell carrier holding the battery cells, which as a unit are called corepack, with the electronics unit. A respective connection can be established, for example, via a latch connection, where respective latching devices are provided at the corepack in which latch protrusions reach behind the electronics unit under mechanical deformation and in this manner provide a positive connection.

In addition to the pc-board, the electronics unit may also include an electronics housing in which the pc-board with the attached sheet metal conductors can be placed. Finally, the pc-board holds a number of other electronics elements and a software for controlling or even for recognizing the battery pack can be loaded onto the pc-board. Additional components, in particular switches but also charge level indicators may also be connected with the pc-board. The pc-board is then, in particular, inserted into the electronic housing and the electronic housing is sealed using a resin such that the pc-board is positively connected with the electronics housing. Finally, the invention relates to a hand-held power tool with an electric motor and a detachable battery pack of the kind described above that can be locked together with said motor and that drives the motor, whereby a device for establishing the mechanical and electrical contact of the battery pack with a housing of the hand-held power tool is provided.

In the following, the invention shall be described in greater detail using a drawing, whereby FIG. 1 shows an exploded view of the electronics unit as well as the corepack of a battery pack;

Figure 1:
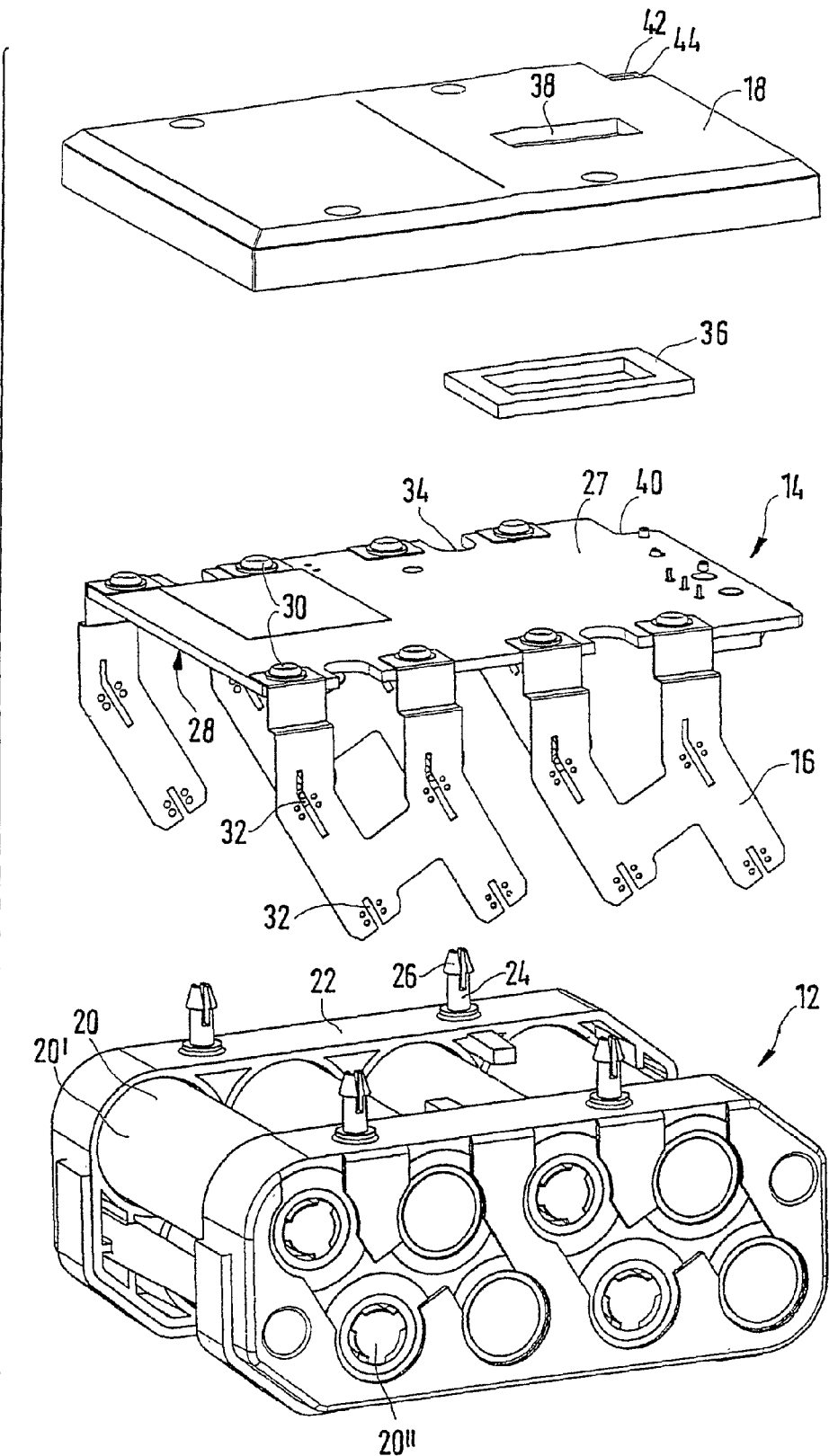

FIG. 1 shows an exploded view of a corepack (bottom image) which in its entirety is designated with the number 12, as well as a pc-board 14 with sheet metal conductors 16 (center image) and an electronics housing 18 (top image).

The corepack 12 comprises battery cells 20, whereby two cells 20' and 20" each are connected parallel to form one battery cell block. The battery cells 20 are lithium ion cells that, contrary to nickel cadmium cells, allow for parallel connections. The battery cell blocks consist of the battery cells 20' and 20" and are each connected in series. The battery cells 20 are supported by a cell carrier 22 and are separated from each other by said cell carrier such that the battery cells 20 do not contact each other, which could lead to shorts. The poles of the individual battery cells 20 are left open in the cell carrier 22 such that electrical contacting can be carried out.

In addition, a latching device 24 is provided at the cell carrier 22 and consists of four pins that are provided with latches 26. The latches 26 are slotted such that bouncing of the latch halves towards each other occurs in such a manner that the pins 24 including the latches 26 can be guided through an opening and then after rebounding a locking occurs behind the protrusion.

Later, during assembly, the electronics unit shown in the center image is placed on the corepack 12. The electronics unit includes a pc-board 14 that features various soldering points on its upper side 27 and also an electronic circuit that allows for loading a software. Additional electronics assemblies are located on the bottom side 28 of the pc-board 14, for example light sources for a charge level indicator and switches, etc.

The sheet metal conductors 16 are connected with the pc-board 14 using rivets 30 and have a material connection with the poles of the battery cells 20 via contact areas 32. Both the parallel and the series connections among the individual battery cells are carried out using the sheet metal conductors 16. In addition, the sheet metal conductors 16 provide a connection with the electronics via the rivets 30 that are used to attach the sheet metal conductors 16 to the pc-board 14. A connection of the cells 20 with the electronics using sheet metal conductors has the advantage that vibrations can be compensated because the sheet metal conductors 16 act as spring elements and in addition to the electrical connection a mechanical connection between pc-board and battery cells is established that locates the pc-board at the battery cells 20 after being welded to them.

In addition, the pc-board 14 exhibits recesses 34 that are located in the area of the pin 24 and surround said pin.

Prior to the assembly, the pc-board 14 with the corepack is connected to an electronics housing 18, which is shown in the top image. For this purpose, a sponge rubber element 36 is placed on the pc-board 14, and the pc-board and the sponge rubber element 36 are then inserted into the electronics housing 18. Thereafter, the electronics housing 18 is sealed with a resin such that a solid connection between the pc-board 14 and the electronics housing 18 is established.

Figure 2:
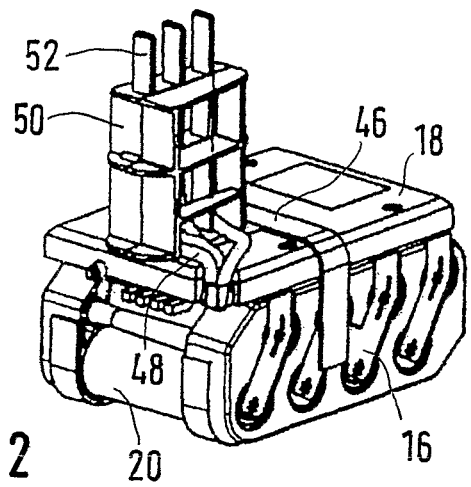
FIG. 2 shows a battery pack without battery housing.

A respective connection can be seen in FIG. 2, where the sealing of the electronics components, for example the pc-board 14, etc. with the electronics housing 18 has already been carried out. The sponge rubber element 36 prevents the cast resin from entering the passage area 38. Later, loading of the software onto the pc-board is done via this passage area 38.

Furthermore, both the pc-board 14 and the electronics housing 18 exhibit a recess 40, or 42, respectively, in one corner area through which cables 48 (ref. FIG. 2) can be routed from the bottom side of the pc-board 14 to the top side of the electronics housing 18. For this purpose, the recess 42 of the electronics housing 18 exhibits a clamp 44 that provides a guide for the cable 48. In the passage area 38, the cables 48 are then connected to a connection pin 50 and guided to the terminals 52, which later serve the purpose of establishing the electrical contact with a hand-held power tool (FIG. 2).

In addition, FIG. 2 shows an already assembled battery pack, however, without a battery housing. In this case, the electronics unit comprising the electronics housing 18 as well as the no longer recognizable pc-board 14 have already been connected to the battery cells 20 by welding. For further dampening, an additional dampening element 46 in the form of a foam strip is placed between the housing and the electronics housing prior to assembly.

Finally, a mechanical latching device for the battery pack with the hand-held power tool is provided using the housing.

Figure 3:
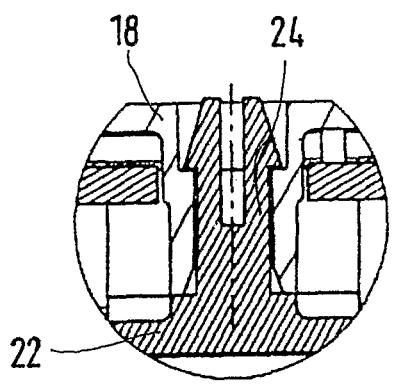
FIG. 3 shows a detail of FIG. 2 with regard to locking.

FIG. 3 shows a detail, where the locking of the corepack 12 via the cell carrier 22 and the slotted pin 24 to the electronics housing 18 can be seen. With regard to their positions, the pins 24 are designed such that after locking they do not protrude beyond the surface of the electronics housing 18, or protrude only insignificantly.

Using the method described above, an electrical and mechanical connection between battery cells 20 to a pc-board can be realized in a particularly simple manner. Through the electrical connection, it is possible to determine the charge level of the individual battery cells 20 or battery cell blocks through the voltage and use this information to control the charging procedure. In addition, such an arrangement offers the advantage of a reliable electrical connection of the battery cells 20 to each other and to the electronics as well as a vibration strength.

The invention claimed is:

1. A battery pack for a hand-held power tool, comprising:
   a multiplicity of elongated battery cells having opposite anode and cathode ends, and which are further oriented in a parallel relationship to the other battery cells;
   a pair of battery cell carriers each having an uppermost, and a lowermost peripheral edge, and further having formed therein a multiplicity of openings which are formed in a given pattern, and which are further dimensioned to individually receive the opposite anode and cathode ends of the respective elongated battery cells, and orient the respective multiplicity of elongated battery cells in a substantially parallel relationship, one relative to the others, and wherein each battery cell carrier further has a latching device mounted on the uppermost peripheral edge, and which further extends substantially normally upwardly therefrom;
   a sheet metal conductor having a proximal end which extends through at least one of the openings which is defined by the respective battery cell carriers, and is further disposed in direct electrical contact with the anode and cathode ends of at least two of the elongated battery cells so as to serially electrically couple together the elongated battery cells, and wherein the sheet metal conductor, has an opposite distal end;

a single printed circuit board having a top and bottom surface, and a pair of laterally disposed peripheral edges, and wherein the single printed circuit board is dimensioned so as to extend between the uppermost peripheral edges of the respective battery cell carriers, and wherein a recess is formed in each of the laterally disposed peripheral edge of the single printed board and which is dimensioned to receive, therethrough, the latching device, and secure the bottom surface of the single printed circuit board in at least partial covering relation relative to the multiplicity of elongated battery cells, and in a location which is positioned between the opposite anode and cathode ends thereof, and wherein the distal end of the sheet metal conductor is electrically coupled to the single printed circuit board;

an electrical cable having a first end and a second end; and a connection pin having a pair of electrical terminals which are electrically coupled to the second end of the electrical cable, and wherein the connection pin releasably, matingly cooperates with a hand held power tool to supply a source of electrical energy to the hand held power tool which is supplied from the respective multiplicity of battery cells.

\* \* \* \* \*